(12) United States Patent
Seel (10) Patent No.: US 10,197,381 B2
(45) Date of Patent: Feb. 5, 2019

(54) DETERMINATION OF THE ROTATIONAL POSITION OF A SENSOR BY MEANS OF A LASER BEAM EMITTED BY A SATELLITE

(71) Applicant: Tesat-Spacecom GmbH & Co. KG, Backnang (DE)

(72) Inventor: Stefan Seel, Murrhardt (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 479 days.

(21) Appl. No.: 14/967,185

(22) Filed: Dec. 11, 2015

(65) Prior Publication Data

US 2016/0169658 A1 Jun. 16, 2016

(30) Foreign Application Priority Data

Dec. 12, 2014 (DE) .................. 10 2014 018 278

(51) Int. Cl.

| *G01S 5/00* | (2006.01) |
|---|---|
| *G01B 11/00* | (2006.01) |
| *G01S 3/784* | (2006.01) |
| *G01S 5/16* | (2006.01) |
| G01S 19/14 | (2010.01) |
| G01S 13/87 | (2006.01) |
| G01S 13/90 | (2006.01) |

(52) U.S. Cl.
CPC .............. *G01B 11/00* (2013.01); *G01S 3/784* (2013.01); *G01S 5/0072* (2013.01); *G01S 5/163* (2013.01); G01S 13/87 (2013.01); G01S 13/90 (2013.01); G01S 19/14 (2013.01)

(58) Field of Classification Search
CPC ..................................... G01B 11/00

USPC ......................................... 250/340
See application file for complete search history.

(56) References Cited

U.S. PATENT DOCUMENTS

| 6,484,073 B1 * | 11/2002 | Fichter .................... G01S 5/163 |
|---|---|---|
| | | 244/164 |
| 2009/0222153 A1 | 9/2009 | Johnson |
| | (Continued) | |

FOREIGN PATENT DOCUMENTS

| EP | 0 824 075 A2 | 2/1998 |
|---|---|---|
| JP | 02145919 A * | 6/1990 |

OTHER PUBLICATIONS

Ivo Buske, Ralph Schragner, Wolfgang Riede, "A real-time sub-μrad laser beam tracking system", Proc. SPIE 6738, Technologies for Optical Countermeasures IV, 67380F (Oct. 23, 2007); doi: 10.1117/12.735811; https://doi.org/10.1117/12.735811.*

(Continued)

*Primary Examiner* — David P Porta
*Assistant Examiner* — Abra Fein
(74) *Attorney, Agent, or Firm* — Crowell & Moring LLP (57) ABSTRACT

The invention relates to the determination of the rotational position of a sensor by means of a laser beam emitted by a satellite. For this purpose, the sensor includes a rotational position determination device which has a laser beam detection device for detecting the laser beam emitted by the satellite. Moreover, the rotational position determination device includes a control device which is designed for determining the rotational position of the rotational position determination device based on the detected laser beam.

16 Claims, 3 Drawing Sheets

(56) References Cited

U.S. PATENT DOCUMENTS

2013/0125667 A1    5/2013  Fitz-Coy et al.
2014/0340427 A1*  11/2014  Baker .................. G06T 3/0062
                                                                    345/641

OTHER PUBLICATIONS

English Translation of JP 02145919 A.*

* cited by examiner

DETERMINATION OF THE ROTATIONAL POSITION OF A SENSOR BY MEANS OF A LASER BEAM EMITTED BY A SATELLITE

CROSS REFERENCE TO RELATED APPLICATIONS

This application claims priority under 35 U.S.C. § 119 from German Patent Application No. 10 2014 018 278.9, filed Dec. 12, 2014, the entire disclosure of which is herein expressly incorporated by reference.

TECHNICAL FIELD

The invention relates to the determination of a rotational position of a sensor. In particular, the invention relates to a rotational position determination device, a sensor which includes a rotational position determination device, an aircraft, a satellite, and a method.

TECHNICAL BACKGROUND

There are many different types of sensors in which an accurate determination of the rotational position of the sensor or an accurate orientation of the sensor is necessary. Examples of such are high-resolution camera sensors of near-earth satellites or of surveillance aircraft or unmanned aerial vehicles (UAV).

The rotational position of sensors may take place locally, for example, by means of a mechanical, electrical, or optical device, for example a gyroscope, a MEMS, a fiber optic gyroscope, or magnetohydrodynamic sensors. In addition, the rotational position determination of the sensor may also be determined by means of so-called star trackers, which use fixed stars as a reference source.

DESCRIPTION OF THE INVENTION

It is an object of the invention to determine the rotational position of sensors more accurately, and at the same time, to reduce the technical effort necessary for this purpose.

This object is achieved by the subject matter of the main independent claim and the other independent claims. Refinements and embodiments are apparent from the dependent claims, the description, and the figures.

The invention is based, among other things, on the finding that determining the rotational position of a sensor, for example with gad accuracy, by means of a local device may be associated with a high level of technical effort. Furthermore, the invention is based on the finding that the accuracy of so-called star trackers may be limited due to the large field of view (almost hemispheric) and the CCD averaging times, since fixed stars are relatively faint.

A first aspect of the invention relates to a rotational position determination device for a sensor, which includes a laser beam detection device for detecting a laser beam emitted by a satellite, and a control device. The control device is designed for determining a rotational position of the rotational position determination device based on the laser beam detected by the sensor device.

A core concept of the invention may be regarded as using a laser beam emitted by a satellite for determining the rotational position or orientation of a sensor. A very high level of accuracy, for example in the gad range, for determining the rotational position may be achieved in this way. In addition, in contrast to fixed stars, a laser beam emitted by a satellite has a high signal-to-noise ratio, which may be larger by a factor of approximately 100 compared to fixed stars. This offers the advantage that the laser beam detection device does not require long exposure times or averaging times, as is the case for a star tracker, so that the accuracy compared to star trackers may be greatly increased. Moreover, a high level of technical effort for the sensor is not necessary for detecting the laser beam, so that the rotational position determination device is reliable and may be cost-effectively provided.

The sensor may refer to different types of sensors in which a precise determination of the rotational position and/or a precise orientation are/is necessary. For example, the sensor may be a high-resolution camera of a near-earth satellite or of an aircraft, in particular an unmanned aerial vehicle (UAV). However, the sensor may also be an earthbound telescope, for example. In addition, the sensor may also be a radar sensor or some other type of sensor.

The laser beam detection device may be understood to mean a sensor unit for detecting optical and/or infrared laser radiation. Furthermore, the laser beam detection device may be designed for detecting monochromatic laser radiation. That is, the sensor may be specifically designed for detecting a certain wavelength of the laser. The technical effort may be further reduced, and the accuracy increased, by using a monochromatic sensor.

The satellite may be, for example, a geostationary satellite, i.e., a satellite having a geosynchronous orbit. However, the satellite may also have some other orbit, for example a highly elliptical orbit (HEO), a supersynchronous orbit, a medium earth orbit (MEO), or some other orbit in which the satellite is located 1000 km, preferably 2000 km, from the surface of the earth and its position is precisely determinable. In other words, the satellite may have an orbit that is suitable for using the satellite or the laser of the satellite as a reference point.

The laser beam emitted by the satellite may, for example, have bundling which is less than 10 μrad. The wavelength of the laser beam may be 1550 nm or 8864 nm, for example. However, other wavelengths are also possible, depending on the type of laser used. In addition, the laser beam detection device and the laser of the satellite may be precisely coordinated with one another, so that the laser beam detection device is designed for detecting the specific type of laser radiation that is emitted by the satellite. Due to this coordination of the laser beam detection device and the laser beam emitted by the satellite, the rotational position determination device may be further improved; i.e., the precision may be increased and the technical effort may be reduced.

The laser of the satellite may be designed in such a way that the laser beam covers a range having a surface area of approximately 1 km². The satellite may also be designed for aligning the laser with the geographical position of the rotational position determination device. In addition, the satellite may be designed for the laser to scan a range around the geographical position, using the laser beam. For example, the laser may scan an uncertainty range with the laser beam. The scanning may take place, for example, by the laser beam carrying out a circular, helical, or meandering scanning motion.

The control device of the rotational position determination device may be understood to mean a control and/or regulation electronics system of the rotational position determination device. In other words, the control device may also be understood to mean a control loop. The rotational position of the rotational position determination device may be determined, for example, by determining one or two angles with respect to the wavefronts of the laser beam. For example, the laser beam detection device may be designed for determining the particular angle or angles at which the laser beam strikes the laser beam detection device, or the particular angle or angles at which the laser beam is captured by the laser beam detection device. In addition, the control device may be designed for determining a rotational position of the sensor based on the rotational position of the determination device. The rotational position determination device may be designed, for example, to be fixedly connected to the sensor, so that the rotational position of the rotational position determination device at the same time is also the rotational position of the sensor.

In the context of the invention, the rotational position may be understood to mean a rotational position in an earth-fixed coordinate system, i.e., in a geographical coordinate system. That is, the rotational position may be the rotational position with respect to the surface of the earth. The rotational position may be expressed by so-called Euler angles, for example.

The invention may also further relate to a rotational position determination system which includes a rotational position determination device described in the context, and a satellite described in the context of the invention.

According to another embodiment of the invention by way of example, the rotational position determination device also includes a position detection device for detecting a geographical position of the sensor, and a transmission device for transmitting the detected geographical position of the sensor to the satellite.

The geographical position of the sensor may thus be communicated to the satellite, so that the satellite may align the laser beam with the geographical position of the sensor.

The position detection device and the transmission device may be integrated into the rotational position determination device, or may also be situated outside the rotational position determination device. For example, the position detection device and the transmission device may be situated in a ground station. The position detection device may be, for example, a GPS system which is able to detect the position of the sensor. However, the position detection device may also refer to an input device with which the position of the sensor may be input.

In the context of the invention, a geographical position may be understood to mean geographical coordinates or location coordinates. In addition, the geographical position of the sensor may also be understood to mean a flight plan of an aircraft or a near-earth satellite. For example, the flight plan of a near-earth satellite or an aircraft, in particular an unmanned aerial vehicle, may be uploaded to the satellite, so that the satellite knows at which time the laser beam is to be aligned with which geographical position.

The transmission device may be understood to mean a device for communicating with the satellite. Various types of transmission, for example radio waves or laser beams, may be used for the communication.

According to another embodiment of the invention by way of example, the rotational position determination device includes a memory device in which a position of the satellite is stored. The control device is also designed for processing the stored position of the satellite in order to determine the rotational position of the rotational position determination device.

The position of the satellite may include an azimuth angle, for example. The control device may thus determine the inclination or rotational position of the rotational position determination device by comparing the geographical position of the rotational position determination device to the position of the satellite.

According to another embodiment of the invention by way of example, the laser beam detection device is designed for detecting the laser beam with an accuracy of at least 10 µrad, preferably at least 5 µrad, more preferably at least 1 µrad.

For example, the laser beam detection device may include an image sensor whose division into sensor subunits is designed in such a way that an accuracy of at least 10 µrad, 5 µrad, or 1 µrad is achieved. In this way, the rotational position determination device may detect the rotational position with the appropriate accuracy or precision. That is, the laser beam detection device may have a resolution such that the direction of the laser beam may be determined with an accuracy of 10 µrad, 5 µrad, or 1 µrad.

According to another embodiment of the invention by way of example, the laser beam detection device includes an image sensor which is divided into a plurality of sensor subunits, and an imaging optical system for focusing the detected laser beam onto the image sensor. Each sensor subunit of the plurality of sensor subunits is designed for generating an electrical signal upon exposure to the focused laser beam. The control device is designed for determining the rotational position of the rotational position determination device by evaluating the electrical signals.

he imaging optical system may be understood to mean a lens system, a mirror system, and/or an objective system, each of which is designed for focusing the laser beam. The image sensor may also be designed for being able to detect the specific wavelength of the laser beam emitted by the satellite. For example, the image sensor may be a monochromatic image sensor which is able to detect only the wavelength of the laser beam. The image sensor may also be designed for detecting infrared beams.

In other words, the image sensor may be divided into various pixels or sectors. For example, the image sensor may have a small number of sensor subunits, for example four quadrants. However, the image sensor may also be divided into a plurality of pixels.

According to another embodiment of the invention by way of example, the sensor subunits are pixels, and the control device is designed for determining the rotational position of the rotational position determination device by evaluating which pixels generate an electrical signal.

According to another embodiment of the invention by way of example, the image sensor is divided into four sensor subunits designed as quadrants. The control device is designed for determining the rotational position of the rotational position determination device by evaluating intensities of the electrical signals generated by the quadrants. That is, the image sensor may be divided into exactly four quadrants.

For example, the angles of incidence of the laser beam may be determined by subtracting the intensities of the four quadrants from one another, for example in the diagonals.

A further aspect of the invention relates to a sensor which includes a rotational position determination device described in the context of the invention.

In this case, the control device of the rotational position determination device may be designed for determining a rotational position of the sensor based on the laser beam detected by the sensor device.

In addition, the sensor may also have features which are described in the context of the rotational position determination device.

According to another embodiment of the invention by way of example, the control device is designed for orienting the sensor based on the determined rotational position.

For example, a given orientation of the sensor may be predefined, so that the control device, starting from the given rotational position, is able to orient the sensor in such a way that the predefined orientation is achieved.

According to another embodiment of the invention by way of example, the sensor is an optical camera, an infrared camera, a radar sensor, and/or a radar with a synthetic aperture. The camera may in particular be a high-resolution camera of an aircraft or of a near-earth satellite.

A further aspect of the invention relates to a sensor system which includes a first sensor described in the context of the invention and a second sensor described in the context of the invention. The control devices of the rotational position determination devices of the first sensor and of the second sensor are designed for jointly orienting the first sensor and the second sensor.

For example, the first sensor and the second sensor may be situated on a near-earth satellite or on an aircraft. The first sensor and the second sensor may be designed for analyzing the same point or area on the surface of the earth having different wavelengths, or for detecting radiation from this area having different wavelengths. By means of the described system, the first sensor and the second sensor may be oriented very accurately to the same area on the surface of the earth. The control devices of the rotational position determination devices of the first sensor and of the second sensor may also be integrated into a central control device of the sensor system which is designed for jointly orienting the first sensor and the second sensor.

The first sensor and the second sensor may also be mounted, for example, on two different aircraft, satellites, or telescopes, so that the two different aircraft, satellites, or telescopes or the sensors thereof may be jointly oriented.

A further aspect of the invention relates to an aircraft or a near-earth satellite which includes a sensor described in the context of the invention or a sensor system described in the context of the invention.

The aircraft may be a surveillance aircraft and/or an unmanned aerial vehicle (UAV), for example.

A further aspect of the invention relates to a method for orienting a sensor, which includes the step of detecting a laser beam, emitted by a satellite, by means of a rotational position determination device, and the step of determining the rotational position of the sensor based on the detected laser beam.

The steps of the method may also be characterized by features which are described in the context of the rotational position determination device, the sensor, the sensor system, or the aircraft or satellite. In addition, the steps may be carried out in the stated sequence, in some other sequence, or in parallel with one another.

According to one embodiment of the invention by way of example, the method also includes the steps of detecting a geographical position of the rotational position determination device and of transmitting the detected position of the rotational position determination device to the satellite.

According to another embodiment of the invention by way of example, the method also includes the step of processing a position of the satellite in order to determine the rotational position of the sensor.

Further features, advantages, and applications of the invention result from the following description of the exemplary embodiments and figures. All described or graphically illustrated features, alone or in any arbitrary combination, constitute the subject matter of the invention, regardless of their recapitulation in the individual claims or their back-reference.

The illustrations in the figures are schematic and not true to scale. When the same reference numerals are used in the following description in the context of various figures, these refer to identical or similar elements. However, identical or similar elements may also be denoted by different reference numerals.

DETAILED DESCRIPTION OF EXEMPLARY EMBODIMENTS

Figure 1:
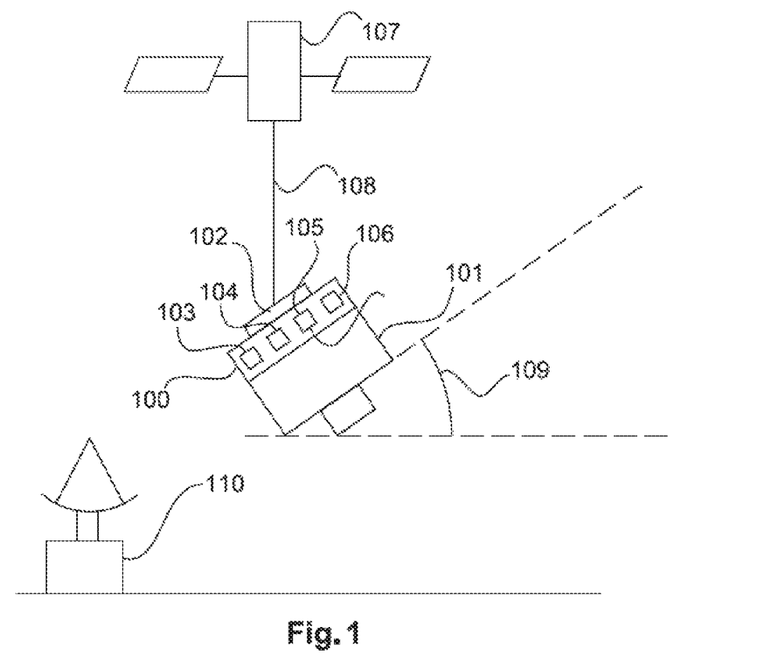
FIG. 1 shows a sensor with a rotational position determination device according to one exemplary embodiment of the invention.

FIG. 1 illustrates a sensor 101 with a rotational position determination device 100 according to one exemplary embodiment of the invention. The rotational position determination device 100 includes a laser beam detection device 102 for detecting a laser beam 108 emitted by a satellite 107. In addition, the rotational position determination device 100 includes a control device 103 which is designed for determining the rotational position of the rotational position determination device 100, and thus also of the sensor 101, based on the laser beam detected by the sensor device. Furthermore, the rotational position determination device 100 includes a position detection device 104 for detecting a geographical position of the sensor 101, a transmission device 105 for transmitting the detected geographical position of the sensor 101 to the satellite 107, and a memory device 106 in which a position of the satellite 107 is stored.

The sensor 101 may be, for example, a high-resolution camera which is mounted on a near-earth satellite or on an aircraft. The rotational position of the rotational position determination device or of the sensor may be the angle of inclination 109 of the rotational position determination device or of the sensor. In addition, this rotational position may also be two angles of inclination 109 with respect to a plane or spherical surface defined by earth coordinates.

The position detection device 104 and the transmission device may be integrated into the rotational position determination device 100, as illustrated. Alternatively, the position detection device 104 and the transmission device may be integrated into a ground station 110.

For example, the sensor may be mounted on a near-earth satellite. In this case, the ground station 110 may transmit a position and/or a flight plan of the near-earth satellite to the satellite 107. In addition, the position detection device is a device of the ground station 110 for setting the flight plan of the near-earth satellite, and the transmission device is a communication device of the ground station for transmitting data to the satellite 107.

In the case that the transmission device 104 is integrated into the rotational position determination device 100 or is situated on the near-earth satellite or on the aircraft, the transmission device may either transmit the position of the sensor 101 directly to the satellite 107, or may transmit the position of the sensor 101 to the satellite 107 via the ground station 110.

Figure 2A:
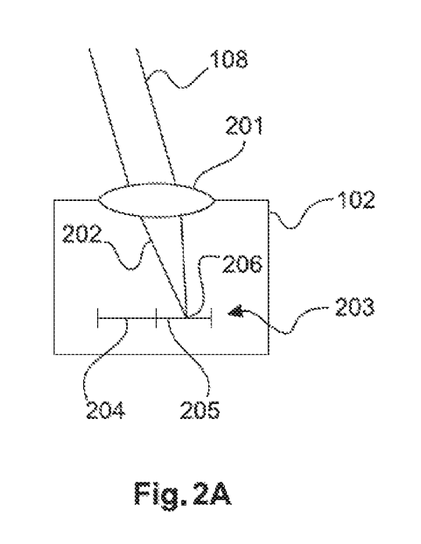
FIG. 2A shows a laser beam detection device of a rotational position determination device according to one exemplary embodiment of the invention.

FIG. 2A illustrates a laser beam detection device 102 according to one exemplary embodiment of the invention. The laser beam detection device 102 includes an image sensor 203 which is divided into a plurality of sensor subunits 204, 205. This image sensor is, for example, a monochromatic CCD sensor which is designed for detecting the laser radiation 108 emitted by the satellite. The laser beam detection device also includes an imaging optical system 201, for example a lens, for focusing the detected laser beam 108, 202 onto the image sensor 203. In other words, the imaging optical system 201 generates from the laser beam 108 a focused beam 202 which strikes a certain point or area 206 on the image sensor 203.

Based on which sensor subunit 204, 205 of the image sensor 203 is directed toward the laser beam 108, the control device of the rotational position determination device may derive the angle(s) with which the laser beam 108 strikes or irradiates the laser beam detection device. Based on this or these angle(s) of incidence or angle(s) of irradiation of the laser beam 108, the control device may in turn determine the rotational position of the rotational position determination device or of the sensor.

Figure 2B:
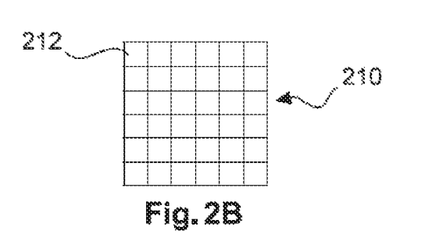
FIGS. 2B and 2C each show an image sensor according to one exemplary embodiment of the invention.

FIG. 2B illustrates an image sensor 210 of a laser beam detection device according to one exemplary embodiment of the invention. The image sensor 210 includes a plurality of pixels 212. The angle of incidence or angle of irradiation of the laser beam 108 may be determined by ascertaining which pixels 212 are exposed to the laser beam or generate electrical signals.

Figure 2C:
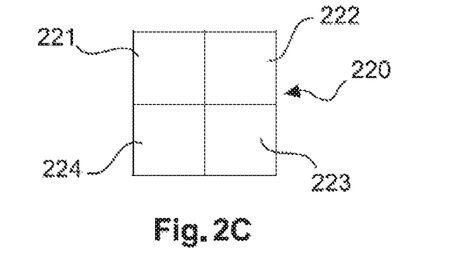

FIG. 2C illustrates an image sensor 220 of a laser beam detection device according to one exemplary embodiment of the invention, which is divided into four quadrants 221, 222, 223, and 224. In this case, the angle of incidence or angle of irradiation of the laser beam 108 may be determined by subtracting the intensities of the individual quadrants 221 through 224 from one another. For example, the intensities may be subtracted from one another via the diagonals; i.e., the intensity of quadrant 221 is subtracted from the intensity of quadrant 223, and the intensity of quadrant 222 is subtracted from the intensity of quadrant 224. However, other subtraction schemes are also possible.

Figure 3:
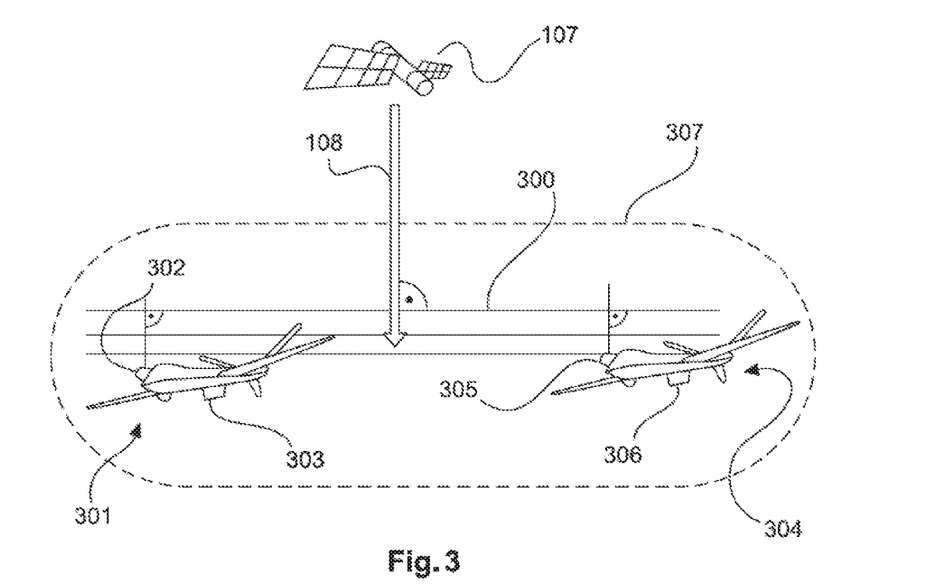
FIG. 3 shows two unmanned aerial vehicles which include a sensor and a rotational position determination device according to one exemplary embodiment of the invention.

FIG. 3 illustrates two unmanned aerial vehicles 301 and 304 which include a sensor 303 and 306, respectively, and a rotational position determination device 302 and 305, respectively, according to one exemplary embodiment of the invention. In addition, a satellite 107 is illustrated which emits a laser beam 108. The rotational position determination devices 302 and 305 may each determine the rotational position based on this laser beam 108 or based on the wavefronts 300 of the laser beam.

For example, the first sensor 303 of the first unmanned aerial vehicle 301 and the second sensor 306 of the second unmanned aerial vehicle 304 may be designed for detecting the same point or the same area of the surface of the earth. In order to be oriented to this same point or area, the rotational position of the respective sensors 303 and 306 is precisely determined based on the laser 108 or the wavefronts 300 thereof. For example, the first sensor 303 may be a high-resolution optical or infrared camera, while the second sensor 306 may be a radar with a synthetic aperture. Another example is that the first sensor 303 is a radar transmitter for transmitting radar beams, and the second sensor 306 is a radar receiver for receiving the reflections of the emitted radar beams. In other words, the first sensor 303 and the second sensor 306 form a sensor system 307.

Figure 4:
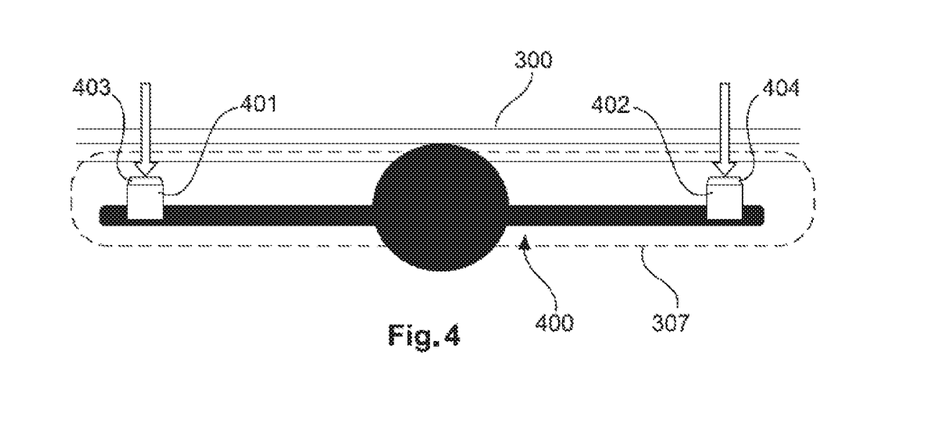
FIG. 4 shows an unmanned aerial vehicle with two sensors, each of which includes a rotational position determination device according to one exemplary embodiment of the invention.

FIG. 4 illustrates an unmanned aerial vehicle 400 according to one exemplary embodiment of the invention, which includes a sensor system 307. The sensor system 307 includes a first sensor 401 having a first rotational position determination device 403, and a second sensor 402 having a second rotational position determination device 404. The first rotational position determination device 403 and the second rotational position determination device 404 are designed for determining the respective rotational position based on the laser beam emitted by the satellite or the wavefronts of the laser beam. As described above, the first sensor and the second sensor may be different sensors, for example a high-resolution camera and a radar sensor, which detect the same point on the surface of the earth.

Figure 5:
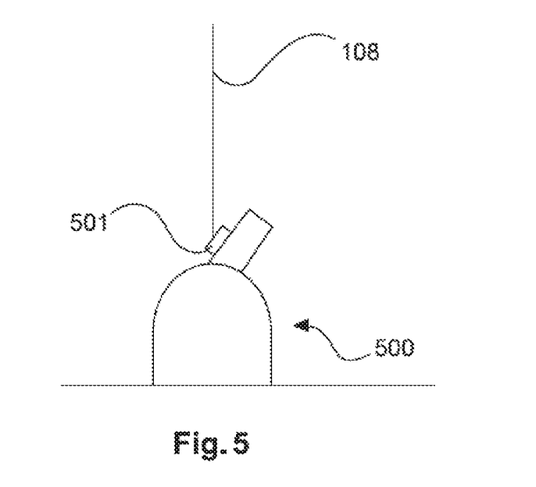
FIG. 5 shows a telescope with a rotational position determination device according to one exemplary embodiment of the invention.

FIG. 5 illustrates a telescope 500 which includes a rotational position determination device 501 according to one exemplary embodiment of the invention. By use of the rotational position determination device 501, the telescope 500 may be precisely oriented by means of the laser beam 108 emitted by the satellite.

Figure 6:
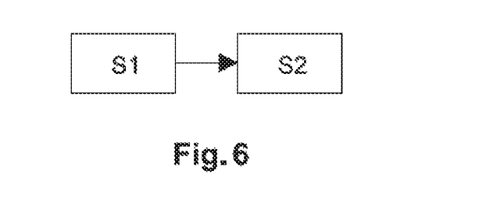
FIG. 6 shows a flow chart for a method according to one exemplary embodiment of the invention.

FIG. 6 illustrates a flow chart for a method for orienting a sensor according to one exemplary embodiment of the invention. The method includes the step S1 of detecting, by means of a rotational position determination device, a laser beam emitted by a satellite, and the step S2 of determining the rotational position of the sensor based on the detected laser beam.

Figure 7:
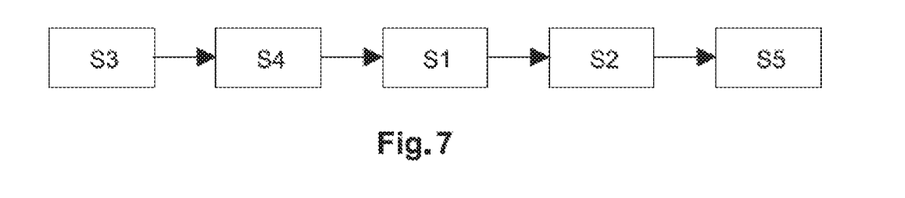
FIG. 7 shows a flow chart for a method according to one exemplary embodiment of the invention.

FIG. 7 illustrates a flow chart for another method for orienting a sensor according to one exemplary embodiment of the invention. The method includes the step S3 of detecting a geographical position of the rotational position determination device, the step S4 of transmitting the detected position of the rotational position determination device to the satellite, the step S1 of detecting, by means of a rotational position determination device, a laser beam emitted by the satellite, the step S2 of determining the rotational position of the sensor based on the detected laser beam, and the step S5 of processing a position of the satellite in order to determine the rotational position of the sensor.

In addition, it is pointed out that the words "including" or "having" do not exclude other elements, and the words "a" or "an" do not exclude a plurality. It is further pointed out that features which have been described with reference to one of the above exemplary embodiments or embodiments may also be used in combination with other features of other exemplary embodiments or embodiments described above. Reference numerals in the claims are not to be construed as limiting.

What is claimed is:

1. A rotational position determination device for a sensor, comprising:
a laser beam detection device configured to detect a laser beam emitted by a satellite; and
a control device,
wherein the control device is configured to determine a rotational position of the rotational position determination device based on the laser beam detected by the sensor device,
wherein the laser beam detection device comprises:
an image sensor which is divided into a plurality of sensor subunits; and
an imaging optical system configured to focus the detected laser beam onto the image sensor,
wherein each of the plurality of sensor subunits is configured to generate an electrical signal upon exposure to the focused laser beam,
wherein the control device is configured to determine the rotational position of the rotational position determination device by evaluating the electrical signals generated by the plurality of sensor subunits,
wherein the sensor subunits are pixels, and
wherein the control device is configured to determine the rotational position of the rotational position determination device by evaluating which pixels generate the electrical signals.

2. The rotational position determination device according to claim 1, further comprising:
a position detection device configured to detect a geographical position of the sensor; and
a transmission device configured to transmit the detected geographical position of the sensor to the satellite.

3. The rotational position determination device according to claim 2, further comprising:
a memory device in which a position of the satellite is stored,
wherein the control device is configured to determine, based on the stored position of the satellite, the rotational position of the rotational position determination device.

4. The rotational position determination device according to claim 1, further comprising:
a memory device in which a position of the satellite is stored,
wherein the control device is configured to determine, based on the stored position of the satellite, the rotational position of the rotational position determination device.

5. The rotational position determination device according to claim 1,
wherein the laser beam detection device is configured to detect the laser beam with an accuracy of at least 10 μrad.

6. The rotational position determination device according to claim 1,
wherein the image sensor is divided into four sensor subunits designed as quadrants; and
wherein the control device is configured to determine the rotational position of the rotational position determination device by evaluating the intensities of the signals generated by the quadrants.

7. A sensor which includes the rotational position determination device according to claim 1.

8. The sensor according to claim 7,
wherein the control device is designed for orienting the sensor based on the determined rotational position.

9. The sensor according to claim 7,
wherein the sensor comprises at least one of an optical camera, an infrared camera, a radar sensor, and a radar with a synthetic aperture.

10. An aircraft or satellite which includes a sensor according to claim 7.

11. The method according to claim 10, further comprising determining, based on a position of the satellite, the rotational position of the sensor.

12. A sensor system which includes:
a first sensor which includes a first rotational position determination device; and
a second sensor which includes a second rotational position determination device,
wherein the first and the second rotational position determination devices each comprise:
a laser beam detection device configured to detect a laser beam emitted by a satellite; and
a control device,
wherein each control device is configured to determine a rotational position of a respective one of the first and the second rotational position determination devices based on a respective one of the detected laser beams,
wherein the control devices of the first and the second rotational position determination devices are configured to jointly orient the first sensor and the second sensor.

13. A method for orienting a sensor, the method comprising the acts of:
detecting a laser beam, emitted by a satellite, by a rotational position determination device comprising an image sensor divided into a plurality of pixels;
focusing, by an imaging optical system, the detected laser beam onto the image sensor;
generating, by the plurality of pixels, an electrical signal upon exposure to the focused laser beam; and
determining a rotational position of the sensor by evaluating which pixels generate electrical signals.

14. The method according to claim 13, further comprising the acts of:
detecting a geographical position of the rotational position determination device; and
transmitting the detected position of the rotational position determination device to the satellite.

15. The method according to claim 13, further comprising determining, based on a position of the satellite, the rotational position of the sensor.

16. A rotational position determination device for a sensor, comprising:
a laser beam detection device configured to detect a laser beam emitted by a satellite; and
a control device,
wherein the control device is configured to determine a rotational position of the rotational position determination device based on the laser beam detected by the sensor device,
wherein the laser beam detection device comprises:
an image sensor which is divided into a plurality of sensor subunits; and
an imaging optical system configured to focus the detected laser beam onto the image sensor,
wherein each of the plurality of sensor subunits is configured to generate an electrical signal upon exposure to the focused laser beam,
wherein the control device is configured to determine the rotational position of the rotational position determination device by evaluating the electrical signals generated by the plurality of sensor subunits,
wherein the image sensor is divided into four sensor subunits designed as quadrants, and
wherein the control device is configured to determine the rotational position of the rotational position determination device by evaluating the intensities of the signals generated by the quadrants.

* * * * *